United States Patent
Stacy et al.

(10) Patent No.: US 8,210,118 B2
(45) Date of Patent: *Jul. 3, 2012

(54) FOOD BREADER

(75) Inventors: Robert M. Stacy, Sandusky, OH (US); Jeffery L. Schoewe, Sandusky, OH (US); Michael E. Miller, Sandusky, OH (US); John Joseph Bauer, Norwalk, OH (US); Jogesh Chandran, Sandusky, OH (US); Roy Allen Schippel, Sandusky, OH (US)

(73) Assignee: John Bean Technologies Corporation, Chicago, IL (US)

( * ) Notice: Subject to any disclaimer, the term of this patent is extended or adjusted under 35 U.S.C. 154(b) by 930 days.

This patent is subject to a terminal disclaimer.

(21) Appl. No.: 12/283,103

(22) Filed: Sep. 9, 2008

(65) Prior Publication Data

US 2009/0007842 A1 Jan. 8, 2009

Related U.S. Application Data

(63) Continuation of application No. 11/351,447, filed on Feb. 10, 2006, now Pat. No. 7,448,343.

(51) Int. Cl.
*B05C 19/06* (2006.01)
(52) U.S. Cl. .............. 118/13; 118/24; 118/308; 99/494; 222/280; 222/287
(58) Field of Classification Search ............. 118/13, 118/24, 308; 99/494, 450.1; 426/289; 222/280, 222/287, 350
See application file for complete search history.

(56) References Cited

U.S. PATENT DOCUMENTS

| | | | |
|---|---|---|---|
| 2,525,306 A | 10/1950 | Lunsford | |
| 3,647,189 A | 3/1972 | Johnson | |
| 4,333,415 A * | 6/1982 | Miller et al. | 118/16 |
| 4,496,084 A | 1/1985 | Booth et al. | |
| 4,798,283 A | 1/1989 | Booth et al. | |
| 5,033,332 A | 7/1991 | Riley | |
| 5,052,330 A | 10/1991 | Stacy | |
| 5,056,455 A | 10/1991 | Ritz | |
| 5,924,356 A | 7/1999 | Harper et al. | |
| 6,117,235 A | 9/2000 | Toccaceli et al. | |
| 6,183,792 B1 | 2/2001 | Bettcher et al. | |

(Continued)

FOREIGN PATENT DOCUMENTS

DE 102004010133 9/2005

(Continued)

OTHER PUBLICATIONS

FMC Food Tech, "Engineering Trip Report", Nov. 15-16, 2004.

*Primary Examiner* — Laura Edwards
(74) *Attorney, Agent, or Firm* — Pauley Petersen & Erickson

(57) ABSTRACT

A breading machine for dispensing a coating material onto a food product includes a breading chamber, a continuous conveyor for transporting food products through the breading chamber, a hopper including at least one downspout and a sloped bottom for dispensing coating material onto the food products, a hopper conveyor positioned within the hopper. At least one of an angular position or a vertical position of the hopper conveyor is adjustable to accommodate a variety of free flowing and non-free flowing coating materials. One or more air knives may be positioned in the downspouts to fluidize the coating material to alleviate bridging and/or build-up of the coating material within the downspout.

20 Claims, 8 Drawing Sheets

U.S. PATENT DOCUMENTS

| | | |
|---|---|---|
| 6,244,170 B1 | 6/2001 | Whited et al. |
| 6,269,739 B1 | 8/2001 | Bettcher et al. |
| 6,510,809 B2 | 1/2003 | Kuenen |
| 6,523,726 B1 * | 2/2003 | Tschantz .................. 222/353 |
| 7,448,343 B2 * | 11/2008 | Stacy et al. .................. 118/13 |
| 2005/0045049 A1 | 3/2005 | Muniga et al. |

FOREIGN PATENT DOCUMENTS

| | | |
|---|---|---|
| EP | 0 046 159 A2 | 2/1982 |
| EP | 1 106 085 A1 | 6/2001 |

* cited by examiner

FOOD BREADER

CROSS REFERENCE TO RELATED APPLICATION

This application is a continuation of U.S. application, Ser. No. 11/351,447, filed on 10 Feb. 2006, now U.S. Pat. No. 7,448,343. The parent application is hereby incorporated by reference herein in its entirety and is made a part hereof, including but not limited to those portions which specifically appear hereinafter.

BACKGROUND OF THE INVENTION

The invention relates to a breading machine for selectively dispensing a coating material or breading onto food products which may be coated with batter and breading before being cooked. More particularly, the invention is directed to a breading machine which may be readily converted between dispensing free flowing and non-free flowing coating materials as well as distributing a variety of coating material more efficiently so as to avoid a build up of coating materials within the breading machine.

In the field of large scale or commercial production of prepared foods, many food items are typically provided with a breading or coating prior to cooking. The coating materials are generally dry particulate materials of fine flour and/or seasonings, Japanese style or "J-" crumbs displaying a variety of irregular particle shapes and sizes, or meals, such as cracker or corn meals, which include hard and roughly spherical particles of various sizes. Each of the different coating materials has its own characteristics which affect their distribution and handling within the breading machine. Flour based coating materials which may be wheat or other grain flours include seasoning, spices, shortenings and other ingredients. These materials typically include particles having a fine, dust-like consistency which tend to pack or build-up causing bridging or blocking of the breading machine openings. Japanese or J-crumbs typically include modified wheat flour with small amounts of yeast, salt sugar, vegetable oils and other additives. The J-crumbs include particles which look like shredded pieces bread having particle sizes ranging from half an inch to fine, dust-like particles with a distribution of sizes in between. J-crumbs are not uniformly shaped, are very delicate, and may not withstand the rigors granular coating materials can endure. J-crumbs also self-bridge over larger openings more than other common granular coating materials.

In view of the different characteristics of the coating materials, breading machines are typically designed to handle an individual coating material. Alternatively, breading machines constructed to accommodate different coating materials often involve time-consuming and/or complicated processes to convert from dispensing one type of coating material to another. Large scale food producers desire a breading machine which can handle large volumes of food products while providing a breading or coating on both the top and the bottom of the food products. Thus, breading machines have become larger and more complex and are adapted to run at higher speeds for longer periods of time. Additionally, the handling of various types of coating materials requires that the breading machine distributes fine particles such as flours as well as J-crumbs without damaging the more fragile J-crumbs.

In order to distribute the coating material within the breading machine, one or more conveyors may be positioned within a hopper to sprinkle or spread the coating material onto a food product conveyed beneath an opening in the hopper. Generally, the conveyors are mounted in a fixed position within the hopper making removal or repositioning of the conveyors difficult. Thus, cleaning of the breading machine may be hampered due to the fixed location of the conveyors.

A common problem in the operation of breading machines is the bridging of coating material across openings within the breading machine which reduces and/or stops flow of the coating material. Such bridges or blockages necessitate shutting down the machine to clear the build-up and enable continued operation of the machine. This is particularly a problem when the breading machine is operated at higher speeds for breading a larger volume of food products. Frequent stoppages and/or complicated conversion processes reduce throughput of finished products and increase the costs associated with operating the breading machines.

In view of the above, there is a need or desire for a breading machine which is easily and rapidly convertible from dispensing one form of coating material to another.

There is a further need or desire for a breading machine having improved coating handling capabilities which reduce and/or eliminate bridging, build-up or blockage of coating materials with the machine.

There is a still further need or desire for a breading machine which may be readily cleaned.

SUMMARY OF THE INVENTION

In response to the challenges discussed above, a breading machine having improved coating material handling and which is readily convertible from dispensing one form of coating material to another has been developed.

The breading machine of the invention includes an enclosure defining a breading chamber, a continuous conveyor for transporting food products through the breading chamber, a hopper adapted to dispense a coating material onto the food products and a hopper conveyor positioned within the hopper. The hopper includes at least one downspout and has a downwardly sloping bottom wall. At least one of an angular position and a vertical position of the hopper conveyor is adjustable and the hopper conveyor may be removable. The hopper conveyor may include a pivot mounting and the angular position of the hopper conveyor is adjustable about a horizontal axis of the pivot mounting. At least one air knife may be positioned within the downspout.

In another embodiment, the breading machine includes an enclosure defining a breading chamber, a continuous conveyor for transporting food products through the breading chamber, an upper hopper including two downspouts adapted to dispense coating material onto the food products, a removable hopper conveyor positioned within the upper hopper, a side hopper and an inclined auger for transporting the coating material from the side hopper to the upper hopper. The upper hopper includes a rear wall, two downspouts formed in part by the rear wall, a front wall, a front gate disposed along a bottom edge of the front wall, and a bottom wall which slopes downward from a front edge of the downspouts toward the front gate. The removable hopper conveyor includes a pivot mounting which may be positioned adjacent a front edge of the bottom wall of the upper hopper. At least one air knife is positioned within each downspout. At least one of an angular position and a vertical position of the hopper conveyor is adjustable. The breading machine may also include a sifter plate and/or a coating material recirculation system.

In another embodiment, the breading machine includes an enclosure defining a breading chamber, a continuous conveyor for transporting food products through the breading chamber, a pair of downspouts for dispensing a coating material onto the continuous conveyor, at least one removable air knife positioned within each downspout, an upper hopper adapted for dispensing the coating material onto an upper surface of the food products, a removable hopper conveyor positioned within the upper hopper, a side hopper for collecting and/or storing the coating material, a cross conveyor positioned beneath the continuous conveyor for transporting excess coating material to the side hopper, an inclined auger for transporting the coating material to the upper hopper and the pair of downspouts, and a discharge chute for dispensing the coating material into the upper hopper and the pair of downspouts. The air knives deliver low pressure air into the downspouts to fluidize the coating material within the downspouts. The hopper conveyor includes a pivot mounting positioned adjacent a front gate of the upper hopper and an angular position of the hopper conveyor is adjustable about a horizontal axis of the pivot mounting. The breading machine may further include a sifter plate positioned beneath the discharge chute. The sifter plate, side hopper and/or inclined auger may be removable. The cross conveyor may include a sifting conveyor for removing coating materials having a select particle size.

With the foregoing in mind, particular embodiments of the invention provide a breading machine for efficiently producing a variety of coated food products.

DETAILED DESCRIPTION OF THE INVENTION

The present invention is directed to a breading machine which is readily convertible from dispensing one type of coating material to dispensing another type of coating material (i.e., a grade change) onto food products. In this breading machine an adjustable conveyor is provided within a hopper adapted to dispense coating material onto food products. The angular and/or vertical position of the hopper conveyor within the hopper may be adjusted and the hopper conveyor may be removable to facilitate cleaning and grade changes.

Figure 1:
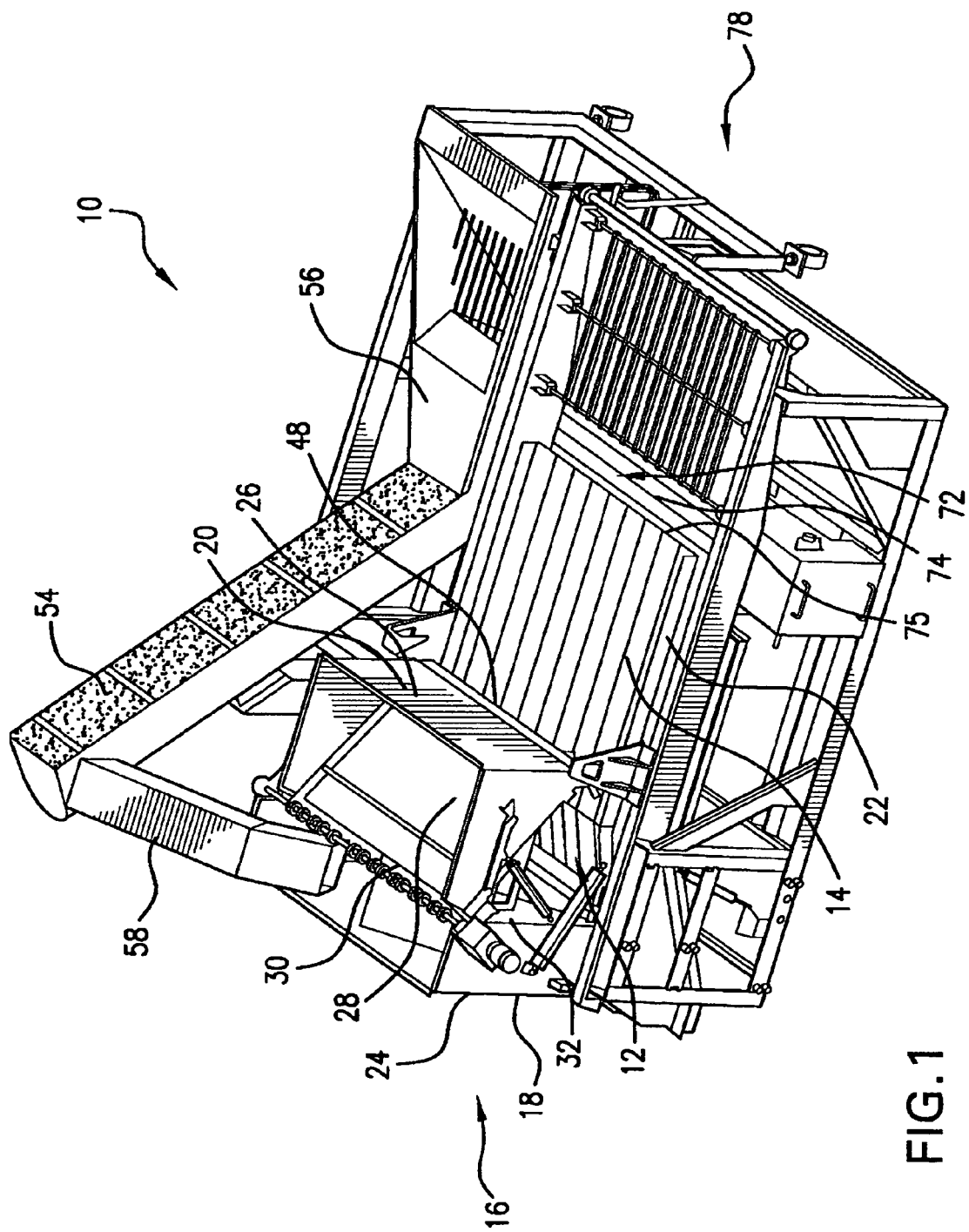
FIG. 1 is a perspective view of a breading machine in accordance with one embodiment of the invention.

Referring to FIG. 1, a breading machine 10 includes an enclosure which defines a breading chamber 12. A continuous conveyor 14 transports food products to be coated into the breading chamber 12. An upper hopper 16 is positioned above the continuous conveyor 14. The continuous conveyor 14 rides along a support pan 22 which forms a bottom surface of the breading chamber 12. The upper hopper 16 includes at least one downspout 18 and a hopper chamber 20.

Suitably, the continuous conveyor 14 includes a pervious, continuous conveyor belt, such as a wire mesh belt, which allows excess coating material to be removed from the belt. The continuous conveyor 14 is designed to fully support food products on at least one surface but is formed to allow a coating material to readily fall through the belt structure. Suitably, the support pan 22 blocks openings in the continuous conveyor 14 to maintain a layer of coating material on an upper surface of the belt as it travels through the breading chamber 12.

Figure 2:
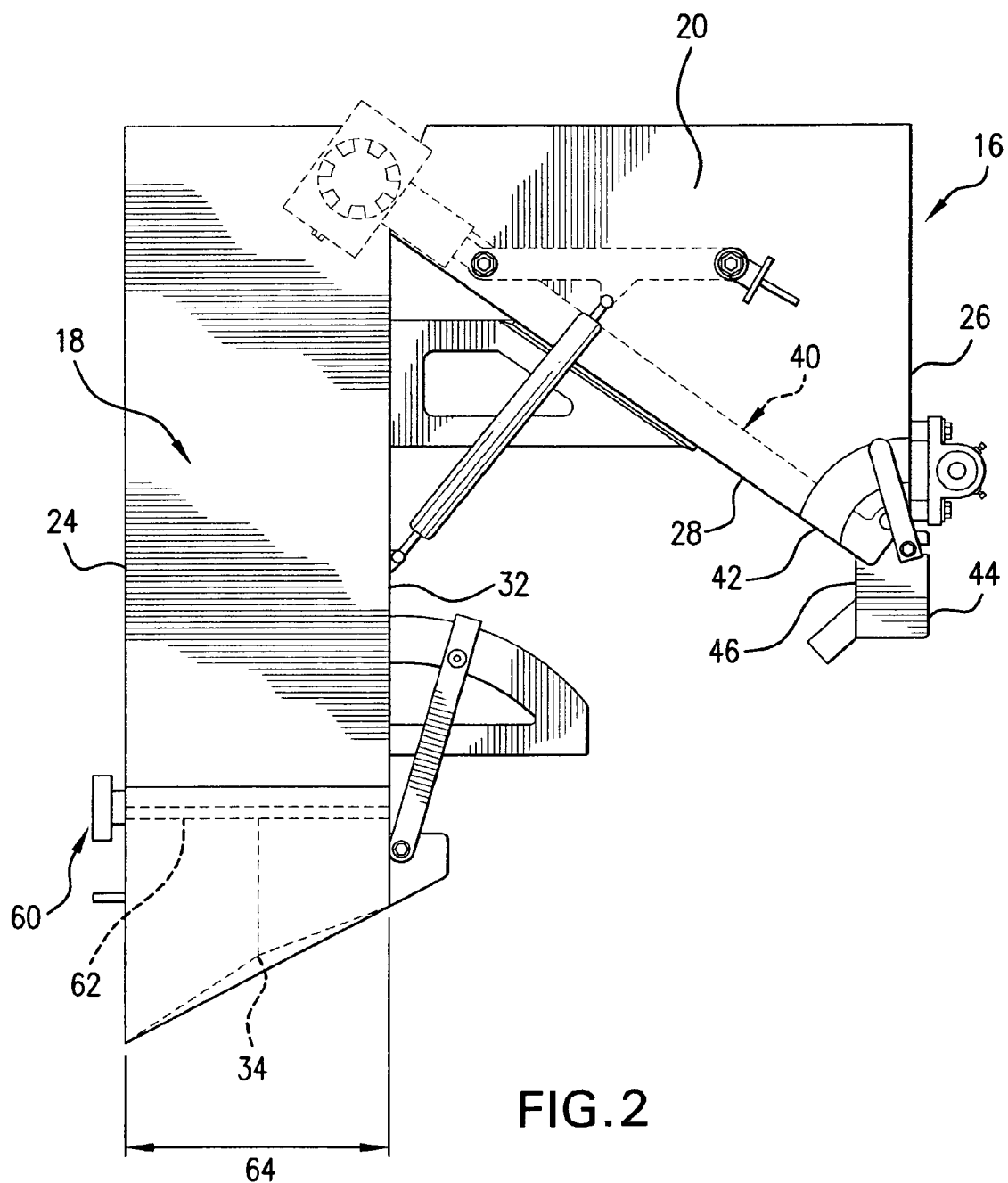
FIG. 2 is a side view of an upper hopper in accordance with one embodiment of the invention.
Figure 3:
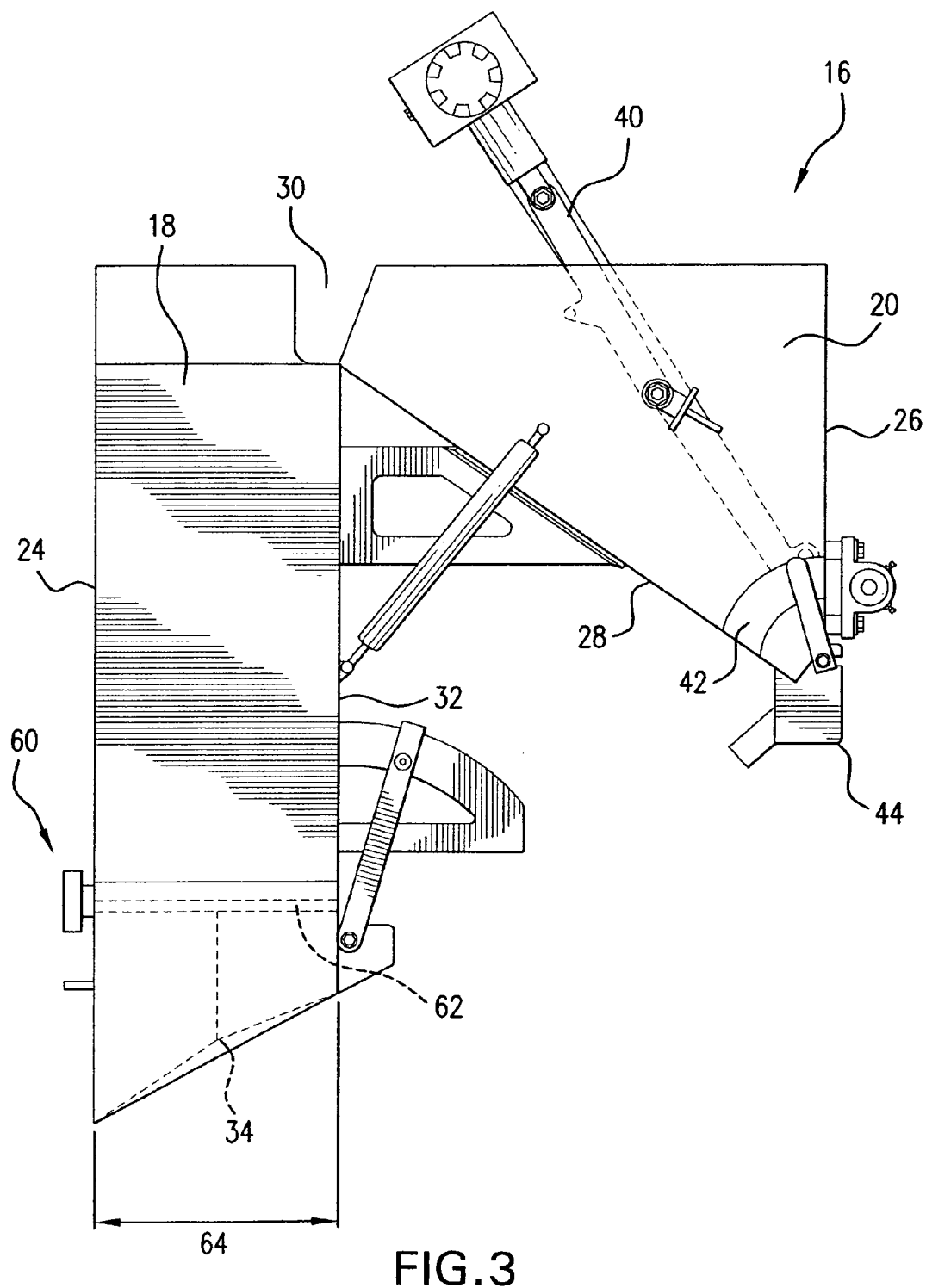
FIG. 3 is a side view of an upper hopper in accordance with another embodiment of the invention.
Figure 4:
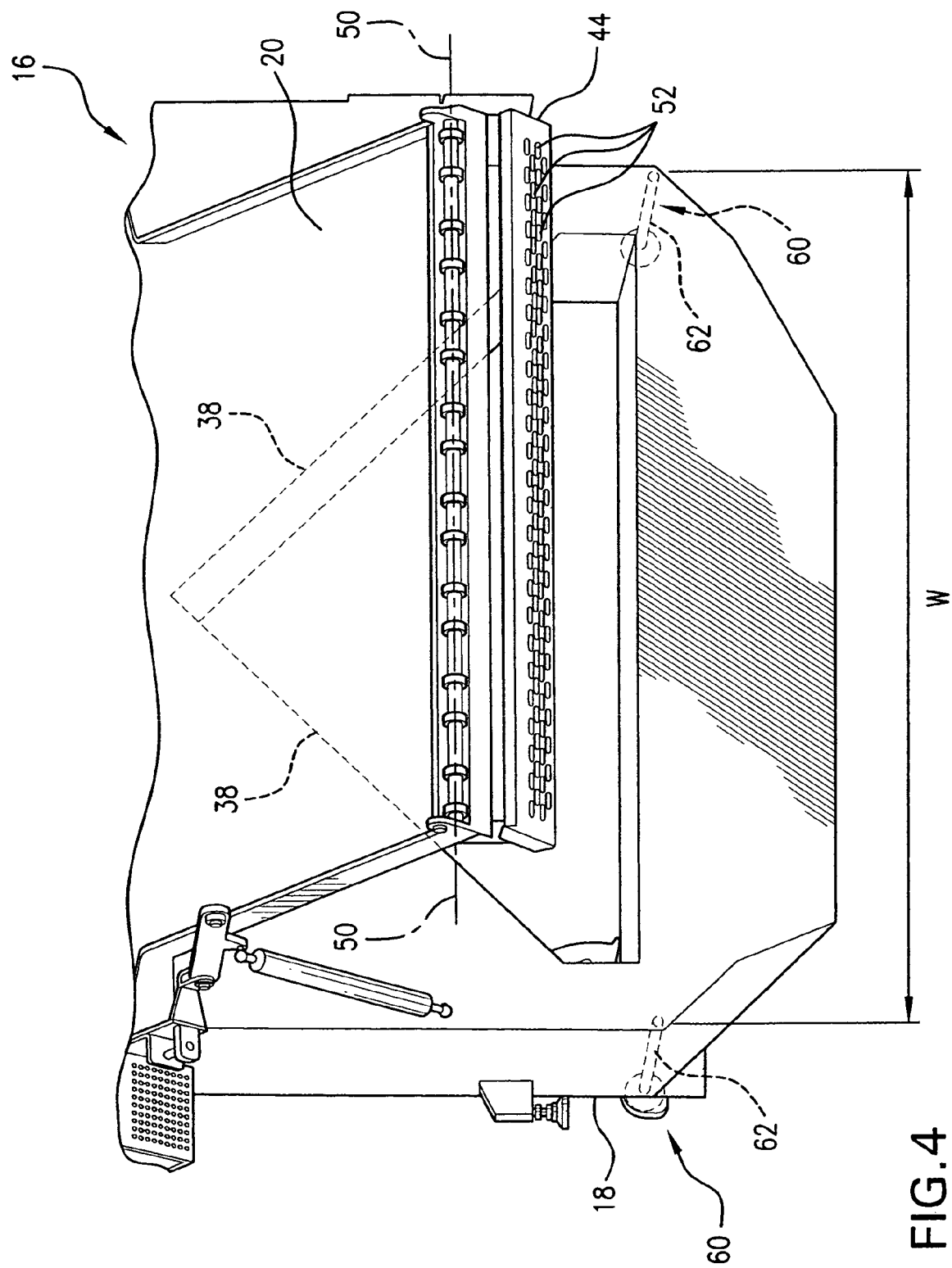
FIG. 4 is front perspective view of an upper hopper in accordance with one embodiment of the invention.
Figure 5:
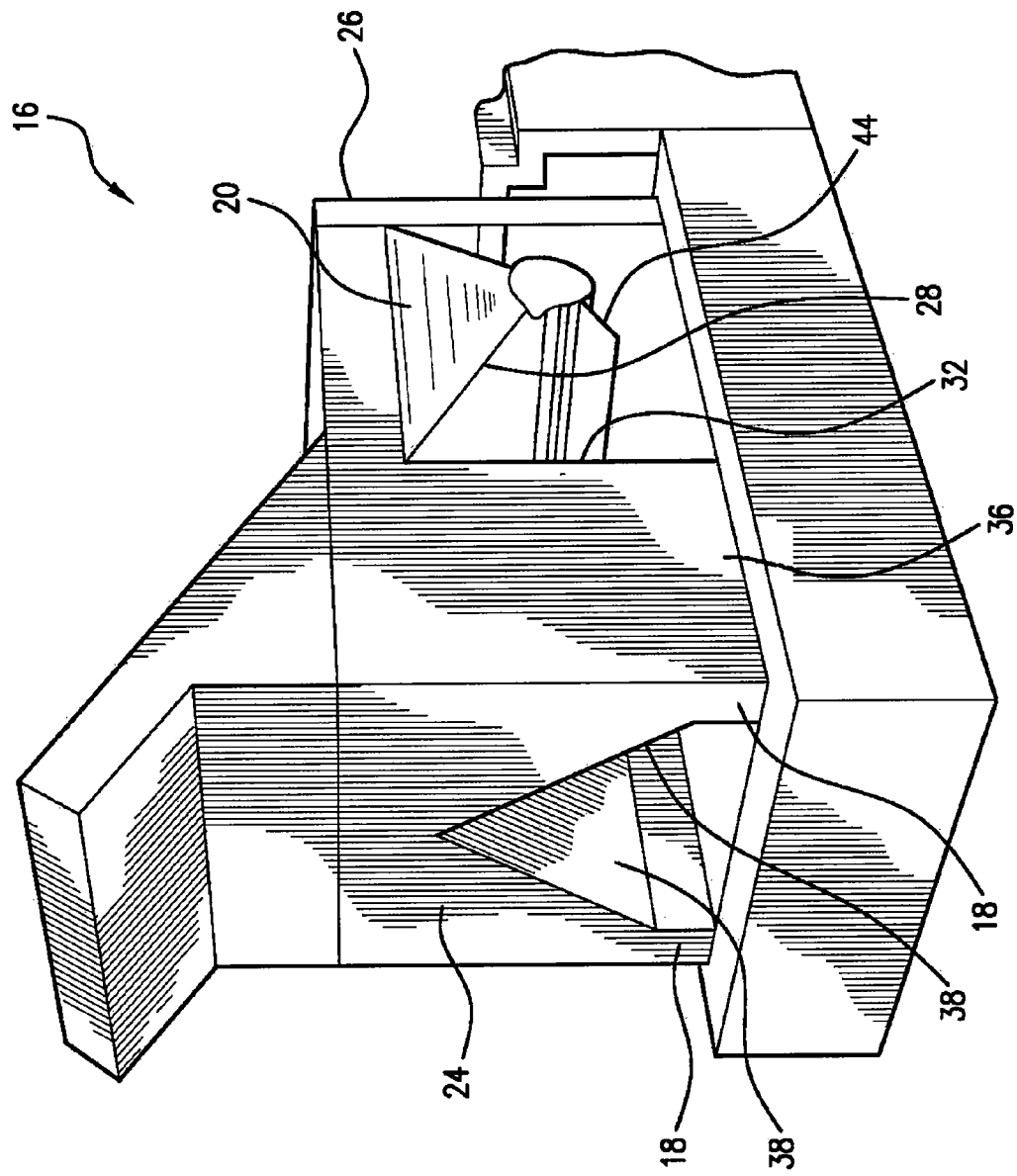
FIG. 5 is a rear perspective of an upper hopper in accordance with one embodiment of the invention.

Referring to FIGS. 1-3, the hopper 16 includes a rear wall 24 which forms, at least in part, a rear wall of the downspout 18. The hopper 16 further includes a front wall 26 and downwardly sloping bottom wall 28. Bottom wall 28 is joined along a ridge 30 to a front wall 32 of the downspout 18. Suitably, as shown in FIGS. 4 and 5, the upper hopper 16 may include a pair of downspouts 18 having openings 34 which are transversely opposed from each other across the width "W" of the breading chamber 12. As shown in FIG. 5, the hopper 16 includes a pair of side walls 36 which forms side walls for both the hopper chamber 20 and the downspouts 18. The downspouts 18 further include a pair of angled interior side walls 38. As can be seen in FIG. 5, the angled interior side walls 38 give the hopper a generally pants-like silhouette when the breading machine 10 is viewed from the rear and promote movement of the coating material disposed within the downspouts toward the openings 34.

Referring to FIG. 4, the upper hopper 16 may include a front gate 44 positioned along a bottom edge 48 of the front wall 26. Suitably, the front gate includes a plurality of openings 52 to dispense the coating materials disposed within the hopper chamber 20 in a fine sprinkle across the width W of the breading chamber 12.

Referring to FIGS. 2 and 3, a hopper conveyor 40 is positioned within upper hopper 16. In accordance with certain embodiments, the hopper conveyor 40 may be removable. Suitably, the hopper conveyor 40 is positioned within the hopper chamber 20 and includes a pivot mounting 42 to secure the conveyor in the hopper. As shown in FIGS. 2 and 3, the pivot mounting 42 may be positioned adjacent a front edge 46 of the bottom wall 28 and/or adjacent the front gate 44 which is positioned along a bottom edge 48 of the front wall 26 of the upper hopper 16. In accordance with certain embodiments of the invention, a vertical position of the pivot mounting 42 may be adjustable. At least one of an angular position or a vertical position of the hopper conveyor 40 is adjustable. For example, referring to FIGS. 2-4, an angular position of the hopper conveyor 42 may be adjusted by pivoting the hopper conveyor 40 about a horizontal axis 50 of the pivot mounting 42. The hopper conveyor 40 may be positioned within the upper hopper 16 in any suitable angle located between the bottom wall 28 and the front wall 26 of the upper hopper.

Thus, the hopper conveyor 40 may be positioned within the upper hopper 16 parallel to the bottom wall 28 of the hopper as shown in FIG. 2. Such a configuration may be desirable when non-free flowing coating materials such as flour-based coating are being dispensed to assist in moving the coating materials down toward the front gate 44 and to reduce and/or eliminate bridging or packing of the coating material within the upper hopper 16.

In another embodiment, the hopper conveyor 40 for may be positioned within the upper hopper 16 parallel to the front wall 26 of the hopper. Such a configuration may be desirable when free-flowing coating materials, such as corn or cracker meals, or Japanese style or "J-" crumbs are being dispensed by the upper hopper 16. The hopper conveyor 40 may be operated in a manner which pulls coating materials upward away from the front gate 44 of the hopper and redistributes the coating materials back onto the bottom wall 28 of the hopper to prevent bridging or blocking of the coating materials. If J-crumbs are being dispensed by the upper hopper 16, the hopper conveyor 40 may be removed entirely, shifted to a vertical position above the front gate 44 where the conveyor does not contact the J-crumbs, or operated in manner which does not damage the more fragile J-crumb particles.

In any of the foregoing embodiments, the direction of the hopper conveyor belt path may be reversible to either push or pull the coating materials toward or away from the front gate 44. Additionally, the hopper conveyor may be operated continuously or intermittently to prevent build-up and/or blockage of coating materials within the hopper chamber 20.

Referring again to FIG. 1, an inclined auger 54 is positioned adjacent the upper hopper 16 and the continuous conveyor 14. Suitably, the inclined auger transports coating materials from a side hopper 56 to the upper hopper 16. Coating materials are dispensed from the inclined auger 54 to both the downspouts 18 and the hopper chamber 20 via a discharge chute 58. Suitably, the inclined auger 54 may be operated on a continuous or an intermittent basis to deliver coating materials to the upper hopper.

In another embodiment, the breading machine 10 may include a motorized conveyor (not shown) for transporting the coating material from the inclined auger 54 into the upper hopper 16.

In another embodiment, the inclined auger 54 may be removed or detached from the breading machine 10 to facilitate cleaning and/or storage. In another embodiment of the invention, the inclined auger 54 and the side hopper 56 may be in the form of a removable module which may be detached from the breading machine 10 to facilitate cleaning and/or storage of the module.

Figure 8:
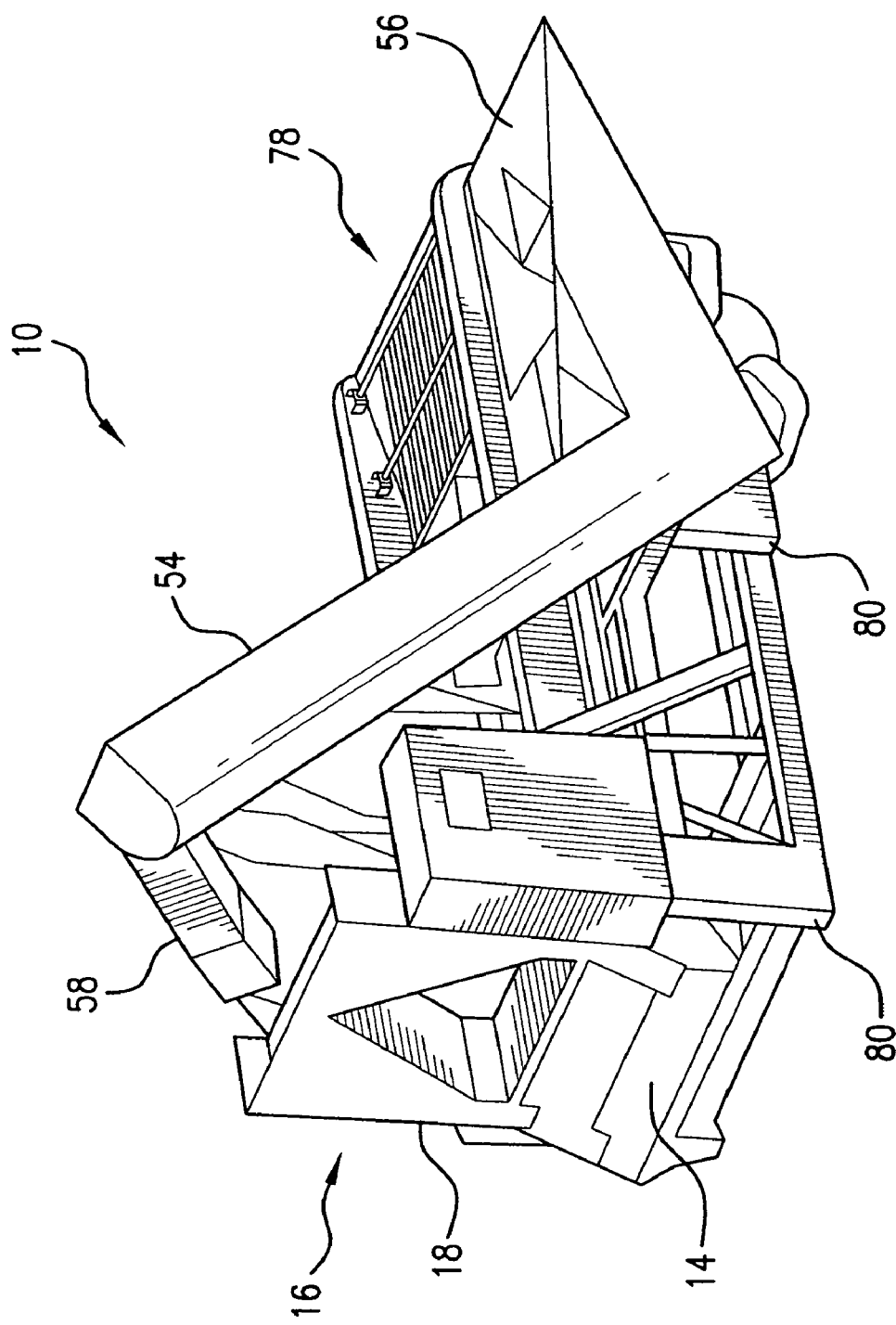
FIG. 8 is a rear perspective view of a breading machine in accordance with one embodiment of the invention.

In another embodiment, the inclined auger 54 may be attached to the breading machine 10 in a fixed manner. As shown in FIG. 8, the inclined auger 54 may be attached to the breading machine 10 by one or more fixed mounting brackets 80.

Referring to FIGS. 2-4, at least one air knife 60 is positioned within each downspout 18. Suitably, the air knives 60 deliver low pressure air into the downspouts 18 to fluidize the coating material to reduce or prevent bridging or build-up of the coating material within the downspout 18 which may impede flow out of the openings 34. Such a configuration may be used, for example, when non-free flowing coating materials such as flour-based coatings are being dispensed by the upper hopper 16. Suitably, the air knives 60 may be removable from the downspouts 18 when not in use or when the breading machine is being cleaned.

As shown in FIGS. 2-4, the air knife 60 may include a tube 62 having a slit or slot therein through which low pressure air is introduced into the downspouts 18. Suitably the tube 62 is positioned to extend across a width 64 of a downspout 18 parallel to the path of the continuous conveyor 14. Suitably, the tube 62 may have any desired cross-section such as, for example, circular, square or oval. Suitably, the tube 62 may have any shape and/or length to conform to the configuration of the upper hopper 16. Advantageously, the positioning of individual air knives 60 may be adjustable to accommodate a variety of coating materials and/or flow directions of the coating materials.

Figure 6:
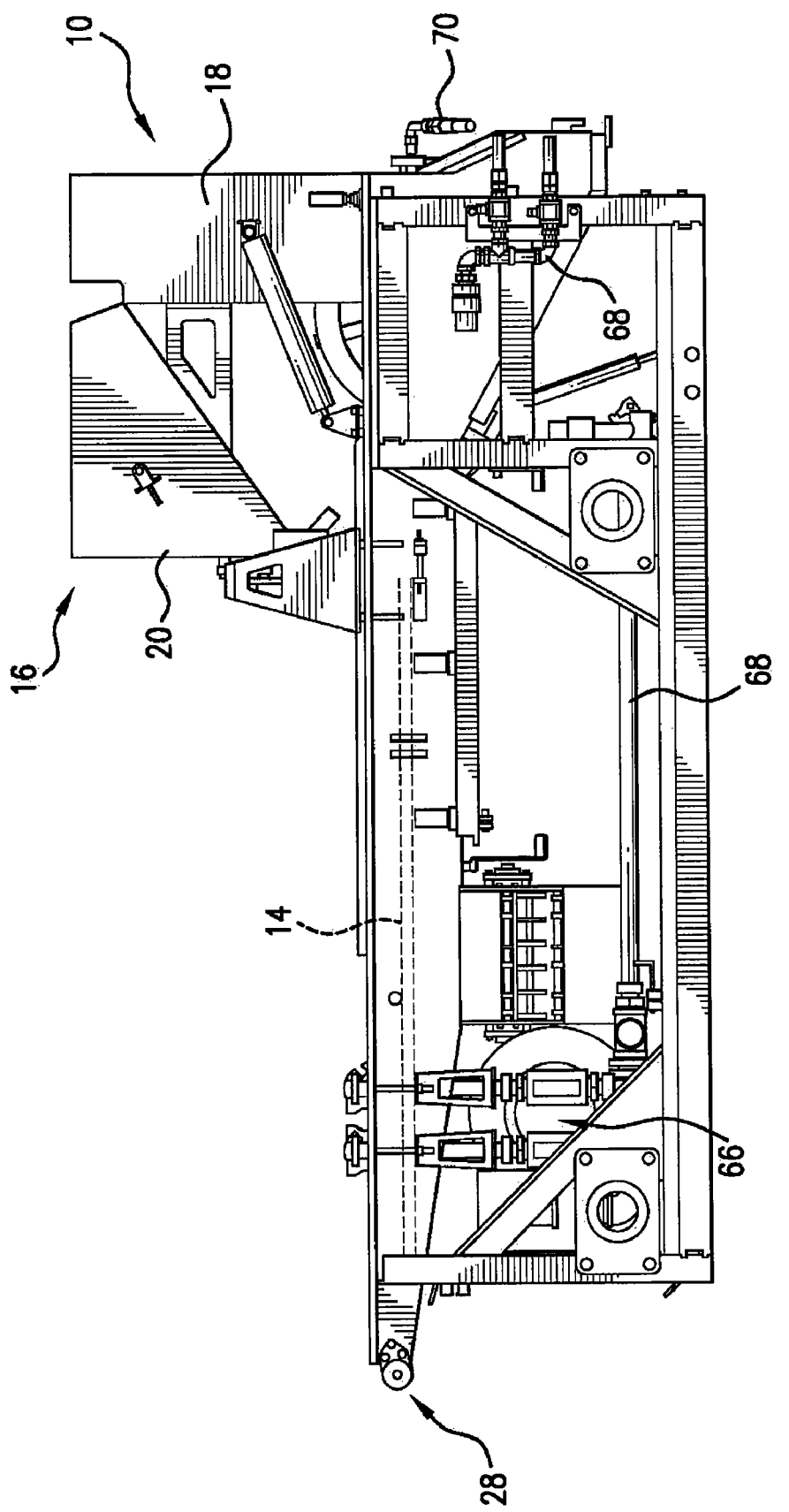
FIG. 6 is a side view of a breading machine in accordance with one embodiment of the invention.

Referring to FIG. 6, the breading machine 10 may include a source of low pressure air such as a mechanical blower 66 which may be connected to the air knives 60 via an air lines 68 connected to an air knife port 70. Alternatively, compressed air may be delivered to the air knives 60 at a low pressure. Suitably, air is introduced into the downspouts 18 at a flow rate of about 1 cfm to about 100 cfm (about 28.3 liter/minute to about 2830 liter/minute). Suitably, air introduced into the downspouts 18 at a pressure of about 0.1 psi to about 100 psi (about 0.007 kg/cm$^2$ to about 7 kg/cm$^2$), about 0.5 psi to about 50 psi (about 0.035 kg/cm$^2$ to about 3.5 kg/cm$^2$) or about 1 psi to about 5 psi (about 0.07 kg/cm$^2$ to about 0.35 kg/cm$^2$).

In another embodiment, the breading machine 10 may include a coating material recirculation system. For example, referring again to FIG. 1, the breading machine may include a cross conveyor 72 positioned beneath the continuous conveyor 14 adjacent a front edge 76 of the support pan 22. Suitably, the cross conveyor 72 includes a pervious continuous belt 74 which travels a path which is perpendicular to the path of the continuous conveyor 14. The cross conveyor 72 carries excess coating material which falls through the continuous belt 14 into the side hopper 56 where the coating material can be stored or recycled to the upper hopper 16 via the inclined auger 54. Suitably, the cross conveyor 72 may be a sifting conveyor including a sifter plate 74 positioned above the cross conveyor, such as is known in the art, that is capable of removing coating materials having a select particle size.

In another embodiment, the breading machine 10 may include a coating material recirculation system as described in commonly owned U.S. Pat. No. 5,506,455 to Ritz, the disclosure of which is hereby incorporated by reference.

Figure 7:
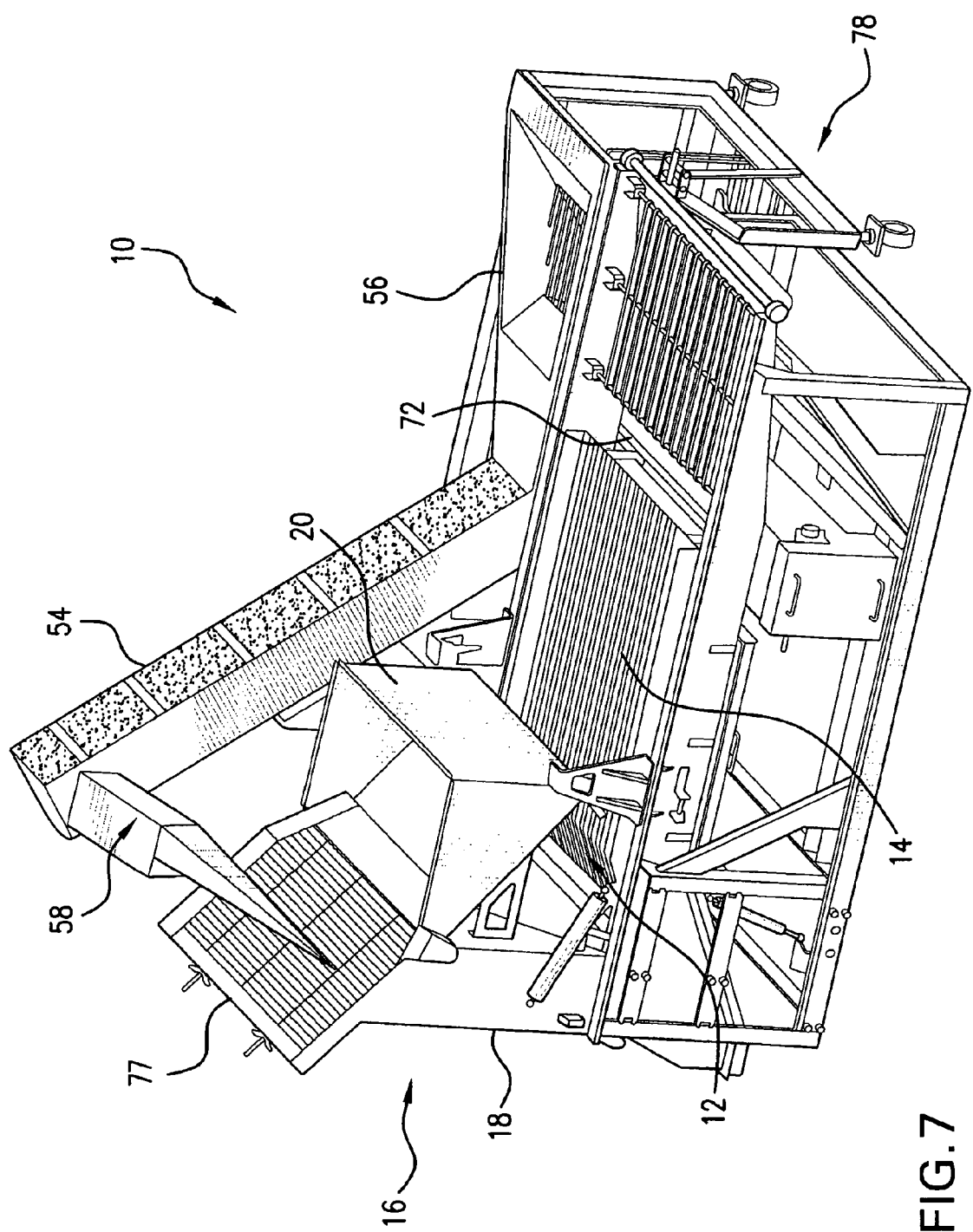
FIG. 7 is a perspective view of a breading machine in accordance with a further embodiment of the invention.

In another embodiment, the breading machine may include sifter plate 77 positioned beneath the discharge chute 58 and above the downspouts 18, as shown in FIG. 7. Alternatively, a motorized conveyor (not shown) may be positioned an outlet of the inclined auger 54 to evenly spread the coating material into the upper hopper 16. Such configurations may be used, for example, when the inclined auger is delivering Japanese style or "J-" crumbs to the upper hopper 16 to evenly distribute the coating material between the downspouts 18 and across the width of the hopper chamber 20. Suitably, the sifter plate is removable when not dispensing J-crumb coating material or for ease of cleaning.

In operation, the breading machine 10 produces coated or breaded food products in the following manner. The continuous conveyor 14 passes beneath the at least one downspout 18 where a layer of coating material is dispensed onto an upper surface of the continuous conveyor 14. Thereafter, battered and/or unbattered food products are fed onto the coating material on the continuous conveyor 14 via an infeed conveyor (not shown) thereby coating a bottom surface of the food products. The partially coated food products are then conveyed beneath the hopper chamber 20 where coating material is dispensed onto a top surface of the food products thereby forming encapsulated food products. As the encapsulated food products exit the breading chamber 12 they pass under one or more soft pressure rolls (not shown) which press the coating material around the food products. As the continuous conveyor 14 passes beyond the front edge 75 of the support plate 22, one or more air knives, curtains or blowers (not shown) positioned adjacent the front edge 75 of the support plate 22 direct air onto the encapsulated food products to remove excess coating materials which fall onto the cross conveyor 72 below. The fully coated food products are then transported to a discharge end 78 of the breading machine 10 where they may be transported to another machine, such as an oven or fryer, for further processing.

While in the foregoing specification this invention has been described in relation to certain preferred embodiments thereof, and many details have been set forth for purposes of illustration, it will be apparent to those skilled in the art that this invention is susceptible to additional embodiments and that certain of the details described herein can be varied considerably without departing from the basic principles of the invention.

We claim:

1. A breading machine for dispensing a coating material onto a food product, comprising:
    an enclosure defining a breading chamber;
    a continuous conveyor for transporting food products through the breading chamber;
    a hopper adapted to dispense the coating material onto the food products, the hopper comprising at least one downspout and a downward sloping bottom wall; and
    a hopper conveyor positioned within the hopper, the hopper conveyor movable from an operational first position to a non-operational second position, wherein in the operational first position the hopper conveyor is disposed over the bottom wall to move a coating material through the hopper.

2. The breading machine of claim 1, wherein in the non-operational second position the hopper conveyor is disposed away from the bottom wall to allow a second coating material to contact and move along the bottom wall.

3. The breading machine of claim 1, wherein the hopper conveyor is parallel to the downward sloping bottom wall of the hopper in the operational first position.

4. The breading machine of claim 3, wherein the hopper conveyor is disposed vertical above a front gate of the hopper in the non-operational second position.

5. The breading machine of claim 1, wherein the hopper further comprises a vertically positioned front wall and a front gate along a bottom edge of the front wall, and the hopper conveyor is positioned parallel to the front wall of the hopper when in the non-operational second position.

6. The breading machine of claim 1, wherein at least one of an angular position or a vertical position of the hopper conveyor is adjustable.

7. The breading machine of claim 1, wherein the hopper conveyor is removable.

8. The breading machine of claim 1, wherein the hopper conveyor comprises a pivot mounting securing an end of the hopper conveyor within the hopper at a lower end of the downward sloping bottom wall.

9. The breading machine of claim 8, wherein a vertical height of the pivot mounting is adjustable.

10. The breading machine of claim 8, wherein the angular position of the hopper conveyor is adjustable about a horizontal axis of the pivot mounting.

11. The breading machine of claim 10, wherein the pivot mounting is positioned adjacent a bottom edge of a front wall of the hopper.

12. The breading machine of claim 1, wherein the hopper comprises two downspouts, each of the two downspouts formed in part by a rear wall of the hopper and a front downspout wall, and the downward sloping bottom wall extends downward from a ridge at a top of the front downspout wall.

13. The breading machine of claim 1, further comprising:
    the hopper including a front wall, a rear wall, a front gate positioned along a bottom edge of each of the front wall and the bottom wall, a downspout formed in part by the rear wall, wherein the bottom wall slopes downward from a top edge of the downspout to the front gate;
    a side hopper; and
    an inclined transport device for transporting the coating material from the side hopper to the upper hopper.

14. The breading machine of claim 13, further comprising a pivot mounting positioned adjacent a bottom edge of the bottom wall, wherein an angular position of the removable hopper conveyor is adjustable about a horizontal axis of the pivot mounting.

15. The breading machine of claim 13, further comprising a coating material recirculation system.

16. The breading machine of claim 15, wherein the coating recirculation system comprises a sifting cross conveyor.

17. The breading machine of claim 13, further comprising a sifter plate.

18. A breading machine for dispensing a coating material onto a food product, comprising:
    an enclosure defining a breading chamber;
    a continuous conveyor for transporting food products through the breading chamber;
    a hopper adapted to dispense the coating material onto the food products, the hopper comprising at least one downspout with a downward sloping bottom wall;
    a pair of downspouts for dispensing the coating material onto the continuous conveyor;
    the hopper including a front wall having a front gate positioned along a bottom edge of the front wall, wherein the bottom wall slopes downward toward the front gate;
    a hopper conveyor positioned within the hopper, the hopper conveyor movable from an operational first position to a non-operational second position;
    a pivot mounting positioned adjacent the front gate of the hopper, wherein an angular position of the hopper conveyor is adjustable about a horizontal axis of the pivot mounting;
    a side hopper for collecting and storing the coating material;
    a cross conveyor disposed beneath the continuous conveyor for transporting excess coating material to the side hopper;
    an inclined auger for transporting the coating material from the side hopper to the upper hopper and the pair of downspouts; and
    a discharge chute for dispensing the coating material to the hopper.

19. The breading machine of claim 18, further comprising a sifter plate positioned beneath the discharge chute, above the cross conveyor, or a combination thereof.

20. The breading machine of claim 18, wherein the side hopper and the inclined auger comprise a detachable module.

* * * * *